United States Patent [19]

Smyth

[11] Patent Number: 4,698,763
[45] Date of Patent: Oct. 6, 1987

[54] AUTOMATIC MECHANICAL TRANSMISSION CONTROL

[75] Inventor: Robert R. Smyth, Bloomfield Hills, Mich.

[73] Assignee: Eaton Corporation, Cleveland, Ohio

[21] Appl. No.: 712,069

[22] Filed: Mar. 15, 1985

[51] Int. Cl.$^4$ .......................................... B60K 41/08
[52] U.S. Cl. .................................. 364/424.1; 74/866; 74/877
[58] Field of Search ............... 364/424.1; 74/866, 751, 74/752 D, 877, 857

[56] References Cited

U.S. PATENT DOCUMENTS

| | | | |
|---|---|---|---|
| 4,274,306 | 6/1981 | Yokoi et al. | 74/877 |
| 4,338,666 | 7/1982 | Suzuki et al. | 364/424.1 |
| 4,361,060 | 11/1982 | Smyth | 74/866 |
| 4,501,171 | 2/1985 | Muller et al. | 74/877 |
| 4,551,802 | 11/1985 | Smyth | 364/424.1 |
| 4,564,906 | 1/1986 | Stephan et al. | 74/752 D |
| 4,576,065 | 3/1986 | Speranza et al. | 364/424.1 |
| 4,599,917 | 6/1986 | Leornt et al. | 74/866 |

FOREIGN PATENT DOCUMENTS

0050261  3/1984  Japan ............................... 364/424.1

Primary Examiner—Parshotam S. Lall
Attorney, Agent, or Firm—D. A. Rowe; H. D. Gordon

[57] ABSTRACT

An improved control system for an automatic change gear transmission (10) driven by a throttle (18) controlled engine (12) is provided. The control system includes a processing unit (30) for receiving inputs indicating at least throttle position (18), engine speed (20) and vehicle speed (28) and for processing these inputs in accordance with a program to determine the correct engaged gear ratio and for issuing command signals to a transmission shifting mechanism (26). The processing unit includes a program having a first mode of operation and a second mode of operation and is effective to operate in the second mode of operation after a shift until reset to the first mode of operation. The engine speeds (52, 48) at which downshifts and upshifts are commanded in the second mode of operation are modified from the normal engine speeds (42, 40) at which downshifts and upshifts are commanded in the first mode in accordance with the direction of the last shift. The improvement includes means response to a calculated expected engine speed (B) at the time of the last shift, and vehicle performance subsequent to the last shift, for resetting the program to the first mode thereof after a shift.

10 Claims, 4 Drawing Figures

AUTOMATIC MECHANICAL TRANSMISSION CONTROL

BACKGROUND OF THE INVENTION

1. Field of the Invention

This invention relates to automatic power transmissions providing a plurality of gear reduction ratios, such as automatic mechanical transmissions, and to control systems therefor In particular, the present invention relates to control systems for vehicles with throttle controlled engines and automatic transmissions wherein gear selection and shift decisions are made and executed based upon measured and/or calculated parameters such as output shaft or vehicle speed, input shaft or engine speed, throttle position, calculated engine speed in a potentially engageable ratio, and the like. More particularly, the present invention relates to automatic transmission control systems of the type described above having means to adjust the shift point profiles in response to the direction of the last shift and means to reset the profiles to the normal positions thereof upon the occurrence of one of more predetermined events such as engine speed being greater than a maximum reset value and/or less than a minimum reset value, the passage of predetermined period of time, etc., wherein the engine speed reset values are functions of measured and/or calculated parameters which provides a control logic which is more responsive to actual conditions at the time of and subsequent to the last shift.

2. Description of the Prior Art

The use of automatic transmissions of both the automatic mechanical type utilizing positive clutches and of the planetary gear type utilizing frictional clutches is well known in the prior art as are control systems therefor. Electronic control systems for automatic transmissions wherein gear selection and shift decisions are made based upon certain measured and/or calculated parameters such as vehicle speed, engine speed, rate of change of vehicle speed, rate of change of engine speed, throttle position, rate of change of throttle position, full depression of the throttle (i.e. "kickdown"), actuation of the braking mechanism, currently engaged gear ratio, direction of the last shift, and the like are known in the prior art. Examples of such automatic transmission control systems for vehicles may be seen by reference to U.S. Pat. Nos. 4,361,060; 4,073,203; 4,253,348; 4,038,889; 4,226,295; 3,776,048; 4,208,929; 4,039,061; 3,974,720 and 3,942,393, the disclosures of which are all hereby incorporated by reference.

Electronic transmission controls are discussed in a technical paper titled "The Automation of Mechanical Transmissions" by Holmes, Smyth and Speranza at Pages 11-23 of Section IX of the published proceedings of a joint IEEE/SAE "International Congress on Transportation Electronics", IEEE Catalog No. 84CH 1988-5, the contents of which are hereby incorporated by reference.

As may be seen by reference to above-mentioned U.S. Pat. No. 4,361,060, to avoid undesireably rapid downshifts after an upshift, or undesireably rapid upshifts after a downshift (i.e. "hunting"), it is known to adjust or modify the shift points or shift profiles after a shift by increasing the upshift engine speed after a downshift and/or decreasing the downshift engine speed after an upshift. It is also known that the shift points or profiles should be reset to their normal positions to achieve desired vehicle operation as quickly as possible after the likelihood of hunting has been minimized. In U.S. Pat. No. 4,361,060, the shift profiles are reset in two increments, one related to the passage of time and the other to engine speed "passing through" a reset engine speed (i.e. going from greater than to less than, or going from less than to greater than, the reset engine speed). The reset engine speed (see line RR in FIG. 10 of U.S. Pat. No. 4,361,060) was the same regardless of the last engaged gear ratio or vehicle (or engine) speed at the time of the last shift.

While the above referenced automatic transmission control system, as defined in U.S. Pat. No. 4,361,060, is very effective to control an automatic transmission by selecting a desired gear ratio which will tend to optimize the fuel economy and/or performance of the vehicle in view of the sensed parameters and then to command a shift into the selected gear ratio, such control systems were not totally satisfactory. In particular, such control systems were not totally satisfactory as the portion of reset of the shift profiles to the normal positions thereof from the direction of last shift offset related to engine speed was not highly responsive to the last engaged gear ratio, the conditions immediately before and after the last shift and the vehicle performance subsequent to the last shift.

SUMMARY OF THE INVENTION

In accordance with the present invention, the drawbacks of the prior art have been overcome or minimized by providing a control system, preferably an electronic control system, for automatic transmissions, such as automatic mechanical transmissions, wherein gear selection and shift decisions are made and executed based upon measured and/or calculated parameters including current input shaft or engine speed, throttle position and/or output shaft or vehicle speed and wherein the predetermined program by which shift commands are generated will modify the shift profiles in accordance with the direction of the last shift and will reset the shift profiles, at least partially, to the normal positions thereof based upon vehicle operating conditions at the time of the last shift and vehicle performance subsequent to the last shift.

The above is accomplished by providing a transmission control system including a central processing unit generating shift patterns based upon sensed or calculated engine speed and throttle position and wherein the shift pattern at which upshifts are commanded is modified by raising the engine speed at which upshifts are commanded in response to the processing unit initiating a downshift and lowering the engine speed at which downshifts are commanded in response to the processing unit initiating an upshift. The shift patterns are at least partially reset to the normal positions thereof when engine speed achieves a predetermined relationship to a reset engine speed value or values which values are calculated at the time of the last shift and are functions of engine speed at the time of the last shift and the numerical ratio of the last engaged gear ratio. Preferably, a non-reset band or range is calculated which is defined by minimum reset engine speed value and a maximum reset engine speed value. The shift patterns will be at least partially reset when the sensed or calculated current engine speed exceeds the maximum reset value (indicating that the vehicle has accelerated) or is less than the minimum reset value (indicating that the vehicle has decelerated). Upon sensing that the vehicle has accelerated or decelerated by a given amount since the last shift, the shift pattern may be reset to the normal positions thereof (to increase fuel efficient and/or performance operation) while minimizing the possibility of undesireable hunting.

Accordingly, it is an object of the present invention to provide a new and improved control system for automatic transmissions having means to modify the shift patterns in accordance with the direction of the last shift and improved means to reset the shift profiles to the normal positions thereof based upon sensed or calculated vehicle operating conditions at the time of the last shift and vehicle performance subsequent to the last shift.

This and other objects and advantages of the present invention will become apparent from a reading of the description of the preferred embodiment taken in connection with the attached drawings.

DESCRIPTION OF THE PREFERRED EMBODIMENT

Figure 1:
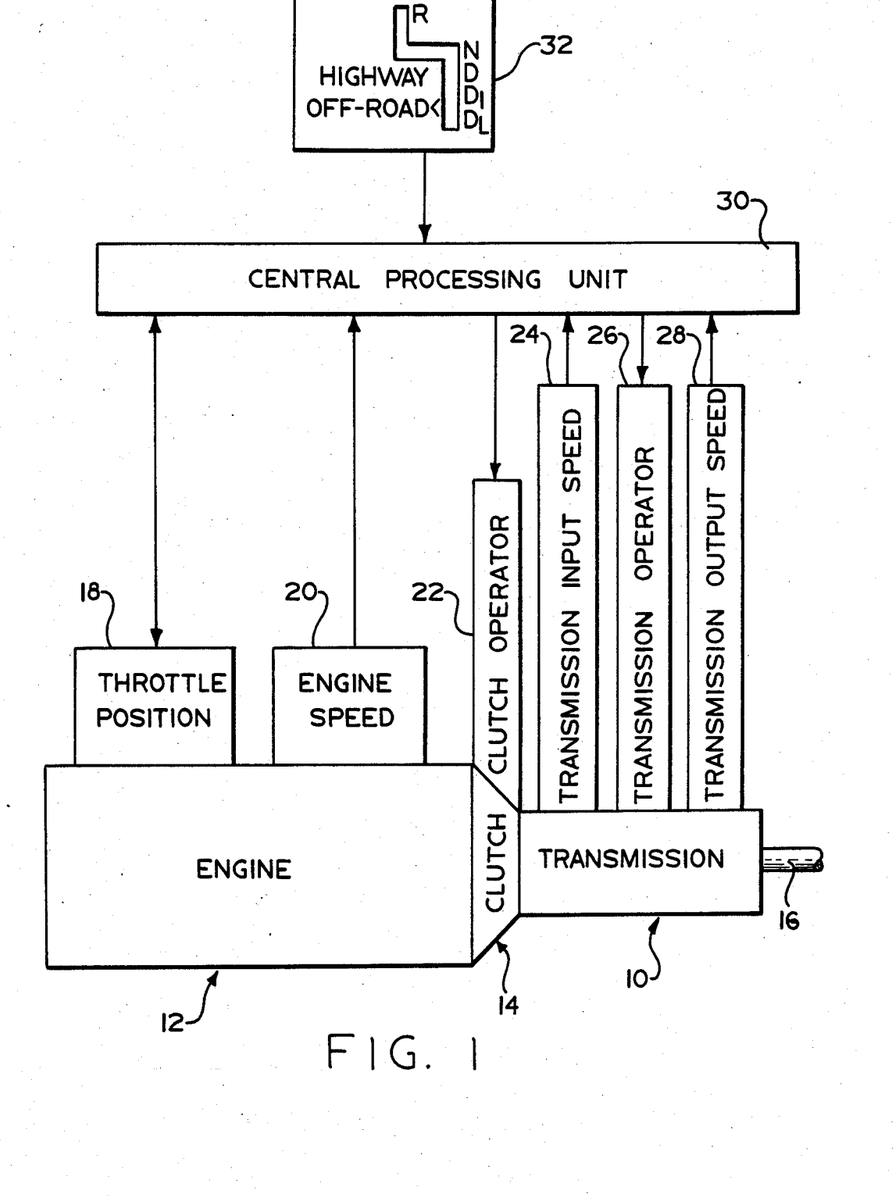
FIG. 1 is a schematic illustration of the components and interconnections of the automatic mechanical transmission control system of the present invention.

FIG. 1 schematically illustrates an automatic multi-speed change gear transmission 10 driven by a throttle controlled engine 12, such as a well known diesel engine, through a friction master clutch 14. The output of the automatic transmission 10 is output shaft 16 which is adopted for driving connnection to an appropriate vehicle component such as the differential of a drive axle, a transfer case or the like as is well known in the prior art. The above mentioned power train components are acted upon and monitored by several devices each of which will be discussed in greater detail. These devices include a throttle position or throttle opening monitor/actuator assembly 18 which senses the position of the operator controlled vehicle throttle or other fuel throttling device, an engine speed sensor 20 which senses the rotational speed of the engine, a clutch operator 22 which engages and disengages clutch 14, a transmission input shaft speed sensor 24, a transmission operator 26 which is effective to shift the transmission 10 into a selected gear ratio, and a transmission output shaft speed sensor 28.

The above mentioned devices supply information to and/or accept commands from a central processing unit 30. The central processing unit 30 may include analogue and/or digital electronic calculation and logic circuitry, the specific configuration and structure of which forms no part of the present invention. The central processing unit also receives information from a shift control assembly 32 by which the operator may select a reverse (R), neutral (N) or several forward drive (D, $D_1$, $D_L$) ) modes of operation of the vehicle. An electrical power source (not shown) and/or source of pressurized fluid (not shown) provides electrical and/or pneumatic power to the various sensing, operating and/or processing units. Drive train components and controls therefor of the type described above are known in the prior art and may be appreciated in greater detail by reference to above mentioned U.S. Pat. Nos. 4,361,060; 3,776,048; 4,038,889; 4,226,295 and 4,361,060.

As is known, the central processing unit 30 receives direct inputs from sensor 18 indicating the present throttle position, from sensor 20 indicating the present engine speed, from sensor 24 indicating the present transmission input shaft speed, from sensor 28 indicating the present transmission output shaft speed, from sensor 29 indicating if the vehicle brakes are applied and from sensor 32 indicating the mode of operation selected by the vehicle operator or driver. In addition to these direct inputs, the central processing unit 30 may be provided with circuitry and/or logic routines for differentiating the input signal from sensors 20 and/or 28 to provide calculated signals indicative of the rate of acceleration of the engine and/or vehicle, means to compare the input signals from sensor 24 and 28 to calculate a current engaged gear ratio, means to compare the current engaged gear ratio with the signal from sensor 28 to provide a calculated engine speed, means to sense full throttle, and means to calculate an expected engine speed in a given engaged ratio and at a given or sensed output shaft speed.

The central processing unit also comprises a memory means for storing certain input and/or calculated information and means for clearing the memory means upon the occurrence of a predetermined event. Additionally, the central processing unit may include a timing device, such as for example a capacitor which decays at a known rate and which may be reset upon the occurrence of a predetermined event to measure a predetermined time interval. Specific circuitry logic devices and/or programmable microcontrollers for providing the above mentioned functions is known in the prior art and an example thereof may be seen by reference to above mentioned U.S. Pat. No. 4,361,060.

The memory means incorporated into the central processing unit 30 may store information such as the direction of the last shift (i.e. upshift or downshift), position of the throttle, rate of change of throttle position, vehicle speed or the like. The memory means may be reset upon the occurrence of a specified event such as engine or vehicle speed being less than and/or greater than a predetermined limit or limits, full application of the throttle, operator throttle setting exceeding or predetermined limit, the occurrence of a gear change, etc.

It is understood that, given a known drive train, output shaft speed and vehicle speed are related in a known manner. Also, assuming a fully engaged master clutch 14, input shaft speed and engine speed are equal and signals indicating any two of input shaft/engine speed, currently engaged gear ratio and output shaft/vehicle speed is sufficient to specify all three parameters.

Sensors 18, 20, 24, 28 and 29 may be of any known type or construction for generating analog or digital signals proportional to the parameter monitored thereby. Similarly, operators 22 and 26 may be of any known electrical, pneumatic or electro-pneumatic type for executing operations in response to command signals from processing unit 30. Sensor 18 may also be an operator to vary fuel supply to the engine to achieve synchronous shifting conditions.

Clutch operator 22 is preferably controlled by the central processing unit 30 and may engage and disengage master clutch 14 as described in U.S. Pat. No. 4,081,065, hereby incorporated by reference. Transmission 10 may include synchronizing means, such as an accelerator and/or a brake mechanism as described in U.S. Pat. No. 3,478,851, hereby incorporated by reference. The transmission 10 is preferable, but not necessarily, of the twin countershaft type as is seen in U.S. Pat. No. 3,105,395, hereby incorporated by reference.

One of the principal functions of the automated mechanical transmission control system is to make decisions as to the proper gear ratio that should be selected and engaged based upon driver demands and operation conditions. Ideally, an electronically controlled transmission can be programmed to enhance specific vehicle characteristics, fuel economy or performance; however, enhancement of one characteristic (i.e., fuel economy) often leads to a degradation of other characteristics (i.e., performance). Furthermore, there are constraints which must be considered which limit the degree to which specific characteristics can be enhanced. Such constraints include the ensurance of safe operation of the vehicle and the minimization of nuisance shifts which lead to increased driver fatigue. No absolute standards are known to exist for most of these constraints.

Selection of the D (on-highway drive) mode on the shift selector 32 by the driver indicates to the central processing unit 30 that peak performance is not required. In this mode, the gear selection subsystem commands shifts, upshifts and downshifts, according to what are referred to as the on-highway shift profiles which are intended to enhance fuel economy.

Similarly, selection of the $D_1$ (drive 1) or $D_L$ (drive low) modes of the shift selector by the driver indicates to the central processing unit 30 the desire to operate at peak performance at the expense of fuel economy. While in the $D_1$ mode or the $D_L$ mode, shifts, both upshifts and downshifts, are selected according to what are referred to as the off-road shift profiles which are intended to enhance vehicle performance. For east of illustration, only operation in the D mode of operation will be considered although it is understood the present invention is also applicable to the performance modes of operation.

The reverse mode, R is preferably implemented by explicit driver selection via the shift selector. Automatic shifting between R and any other ratio is typically not required and not performed.

Figure 2:
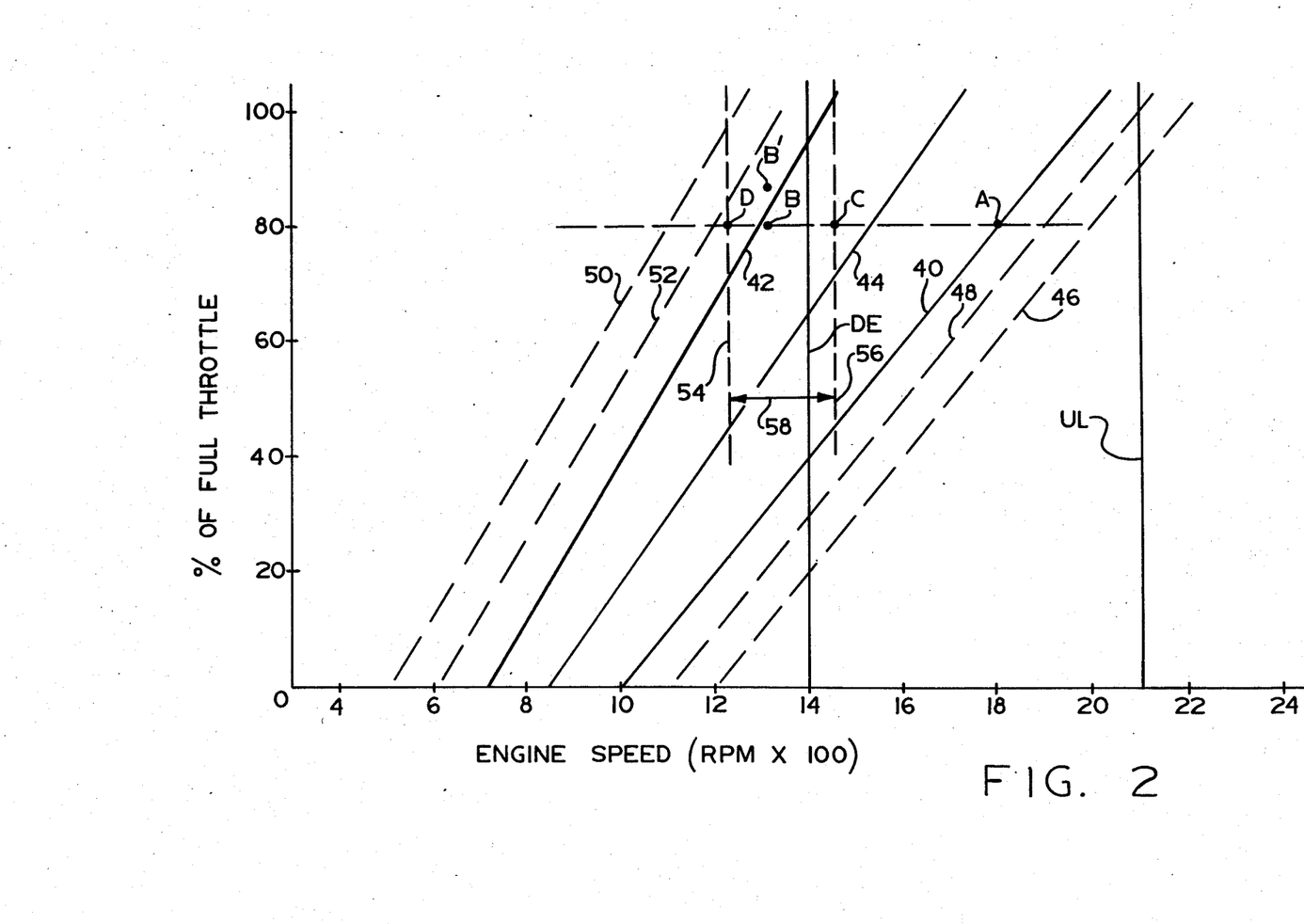
FIGS. 2 and 3 are a graphs of engine speed versus throttle position illustrating the shift patterns, or shift point profiles, and the reset values generated by the control system of the present invention.
Figure 3:
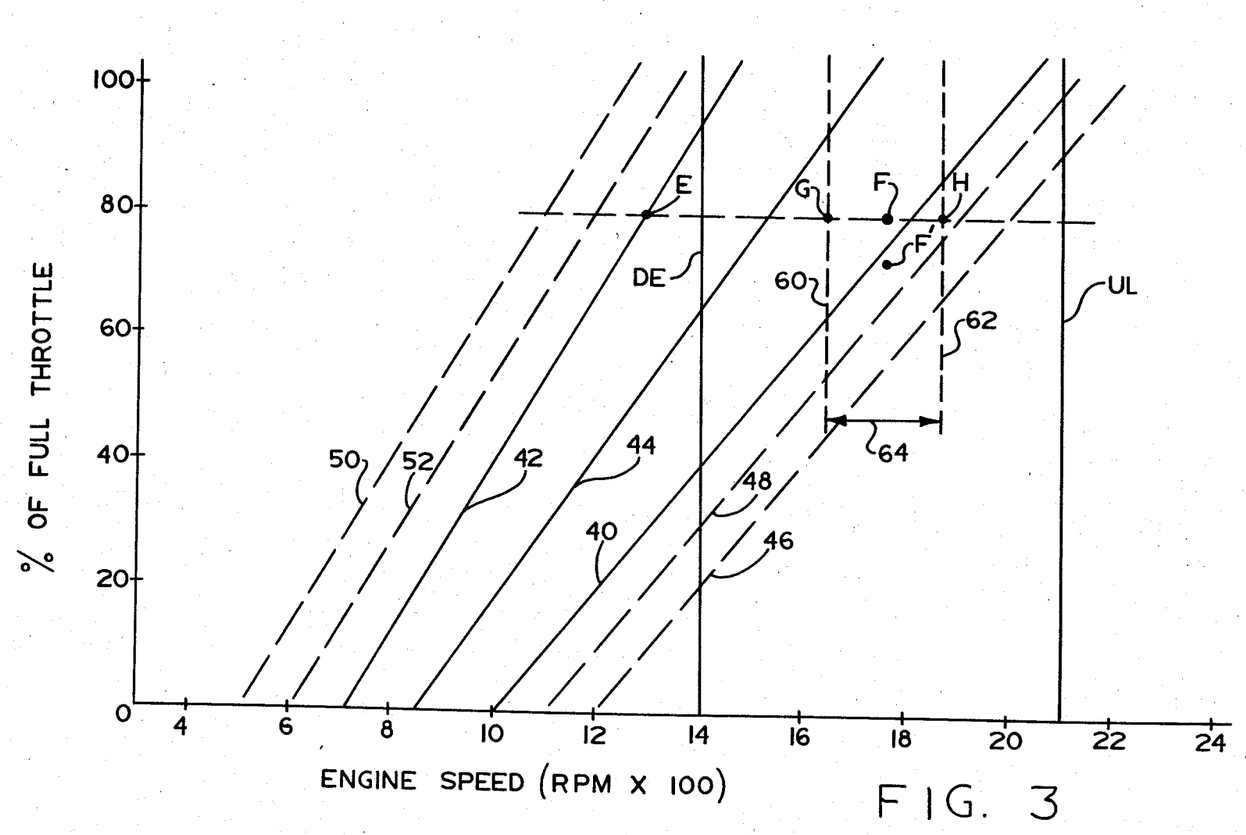

One of the primary purpose of the central processing unit program or logic rules is to generate shift patterns, or shift point profiles, as is graphically illustrated in FIGS. 2 and 3. The shift point profiles generated by the central processing unit will determine if the transmission should remain in the currently engaged gear ratio, should be upshifted to the next highest gear ratio or should be downshifted to the next lower gear ratio. In certain situations, multiple upshifts or downshifts may be selected. The shift point profiles are determined by a predetermined program acting upon current or stored information and are usually selected to provide a compromise between operation at the most fuel efficient possible gear ratio and operation in a gear ratio to provide optimal performance characteristics of the vehicle. In the D mode, the compromise is weighted towards fuel efficiency and in the $D_1$ or $D_L$ modes, the compromise is weighted towards performance. The shift point profiles graphically illustrated in FIG. 2 are a function of both throttle position, expressed as a percentage of maximum throttling position, and of engine speed. For purposes of making shift decisions, the engine speed may be directly sensed or, preferably, is calculated engine speed which will not vary during a shift transient as is known in the prior art.

Both the normal upshift profile 40 and the normal downshift profile 42, also called shiftpoint profiles, shift patterns, etc., provide the basis for shifting the transmission as a function of speed modulated by the driver controlled throttle position. Both sets of profiles are primarily derived from the characteristics of the engine including the effects of all engine driven auxiliaries. For purposes of this example, it is assumed that engine horsepower is substantially linearly related to throttle position and that the ratio steps or splits (i.e. the ratio of gear ratios) are substantially equal allowing a single set of shift profiles to be used for all engaged ratios.

The engine speed signal, shown in FIGS. 2 and 3 in terms of engine RPM, is derived by multiplying the transmission output shaft signal by the numeric value of the gear ratio of the gear currently selected by the control electronics. The selection information, and thus the multiplication factor, is preferably updated immediately for each new selection without reference to the actual mechanical status, thus allowing new shifts to be initiated, if required, during a shift in response to continuing changes in output shaft speed. Throttle position is shown as a percentage of full (i.e. "wide open") throttle from zero percent (0%); to one hundred percent (100%).

It is understood that other sensed or calculated monitored speeds, such as input shaft speed, output shaft speed, vehicle speed or the like may be substituted for engine speed in the shift point profiles illustrated in FIGS. 2 and 3.

Referring to FIGS. 2 and 3, the shift profile includes an on-highway upshift line 40 and an on-highway downshift line 42. Shift profiles 40 and 42 are the normal or running profiles selected to optimize the performance/fuel efficiency of the vehicle when hunting is not a likelihood. Briefly, for operating conditions within the space bounded by downshift line 42 and upshift line 40 no gear change is required, for operating conditions at or to the right of upshift line 40 an upshift to the next highest gear ratio is required and for operating conditions within the area at or to the left of downshift line 42 a downshift to the next lowest gear ratio is required. It is understood, of course, that a single shift point profile may be utilized for all gear ratios of a transmission or a separate shift profile may be generated for each currently engaged gear ratio. Generally, the greater the difference in ratio splits between the gears, the greater the desirability of separate shift point profiles for each current engaged gear ratio.

The shift point profiles also include an upshift limit (UL) at which the transmission must be upshifted and a downshift enable limit (DE) above which the transmission must not be downshifted to prevent speed related damage to the engine. The upshift limit (UL) and downshift enable limit (DE) are not functions of throttle position.

Upshifts occur if the operating point moves to the right of the 40 or UL profiles. Downshifts occur if the operating point moves to the left of the DE and 42 profiles. All of these profiles, shown in their normal position, are subject to movement in response to various sensed and/or calculated signals. These movements and their rational will be described subsequently.

As is known, for a specified internal combustion engine, such as a turbocharged diesel engine utilized in a heavy duty truck, for each throttle position there is an engine speed (usualy expressed in revolutions per minute or "RPM"), or range of engine speeds at which the engine is most fuel efficient. This optimal fuel efficiency operating condition is represented by the line 44. When the clutch 14 is engaged, the speed at which an engine is rotating is determined by the vehicle speed and engaged drive line gear ratio, only the transmission ratio of which is usually conveniently selectively variable, in set increments, in the drive line schematically illstrated in FIG. 1. Accordingly, for maximizing fuel efficiency, The transmission should be shifted as quickly and as often as possible to maintain the engine as close as possible to the maximum fuel efficiency line 44. This can be accomplished by placing the upshift line 40 and the downshift line 42 as closely as possible, while maintaining at least a minimum hysterisis to prevent speed related hunting for proper gear ratio, to the maximum fuel efficiency line 44.

Another concern in selecting desired gear ratio, that is when generating shift point profiles, is vehicle performance. Vehicle performance may be defined as the ability to accelerate at at least a given rate and avoidance of unduly frequent up and down shifts, i.e. nuisance shifting. Generally, optimized vehicle performance requires that the upshift and downshift lines be spaced relatively distant from the optimum fuel efficiency line 44.

It may be appreciated that the maximizing of fuel economy and maximizing of vehicle efficiency are often in conflict. The placement of upshift and downshift lines in a shift point profile is thus an attempt to achieve an optimal compromise between fuel efficiency and vehicle performance. As the relative importance of fuel efficiency and vehicle performance varies under different operating conditions, as determined by central processing unit 30 acting under current and/or stored information in accordance with a program, the upshift and downshift lines are preferably not static but are dynamic. Dynamically moving shift lines are known, and are discussed in greater detail in U.S. Pat. No. 4,362,060. Typically, the shift lines are moved in response to current and/or stored information such as direction of last shift, acceleration of the vehicle, acceleration of the engine, rate of change of throttle position, operation of the vehicle brake or the like.

It is important to understand that the shift point profiles are dependent upon the throttle position as well as the engine speed. Other than selecting a reverse, neutral or forward drive mode of operation of the vehicle by manipulation of selector 32, the operator's only input to the automatic transmission system is his manipulation of the throttle pedal or other fuel control as the case may be. Accordingly, by setting shift profiles and modifying same in partial response to throttle position the operator's desires are accounted for by the central processing unit when deciding the optimal gear ratio at which the transmission is to operate.

The term throttle as used herein means the device or mechanism by which the vehicle operator indicates the amount of fuel he desires to supply to the engine. Usually, the operator can select any amount of fuel varying from zero percent (closed throttle) to one-hundred percent (wide open throttle) of maximum fuel supply. The actual device controlled may be a carburetor, a fuel injector and fuel injection rack or the like.

With a step change transmission, the ratio of engine speeds between any two gears is fixed by the ratio step or split (ratio of gear ratios). With profiles located as previously described, each upshift would lead to an operating point located on or near the downshift lines for the next high gear and vice versa. Hunting between gears would be inevitable. Some additional separation between the upshift and downshift profiles is desireable and acceptable; however, sufficient separation to eliminate hunting can result in an undesireable reduction in fuel economy. To overcome this problem, the control moves the shift profiles as a consequence of a shift. After an upshift, the downshift profile is moved towards lower engine speeds; after a downshift, the upshift profiles are moved towards higher engine speeds. After the tendency for hunting is minimized, the shift profiles should be reset to the normal positions for fuel efficient operation as quickly as possible.

Referring to FIG. 2, after a downshift, the upshift profile will be moved to the right to line 46, and then after a predetermined period of time (usually a fraction of a second), will move leftwardly to line 48 whereat it will remain until the engine speed achieves a reset value allowing the upshift profile to be reset to its normal position 40. Similarly, after an upshift, the downshift profile will be moved leftwardly to line 50, and then, after a predetermined time interval, to line 52. The adjusted downshift profile will be reset from line 52 to line 42, its normal position, upon engine speed achieving a predetermined relationship to a reset value or set of values. This type of shift profile modification in response to the direction of the last shift is described in above-mentioned U.S. Pat. No. 4,361,060.

The shift point profile modifications in response to the direction of the last shift may be considered to each have a time related component defined by the difference between lines 50 and 52, and between lines 46 and 48, at a given throttle position and a drive train condition related component defined by the difference between lines 52 and 42, and lines 48 and 40, at a given throttle position. The present invention relates to cancellation of the drive train condition related component of the direction of last shift shift point profile modification, i.e. to the reseting of the shift profiles to the normal positions thereof (lines 40 and 42) from the drive train condition related components of the adjusted profiles (lines 48 and 52, respectively). The present invention does not relate to the time related components of the shift profile modifications which, for purposes of the present invention, may be considered optional or which could be controlled by the reset procedures which are the subject of this invention.

In the present invention, the shift profiles are reset to the normal positions thereof, i.e to lines 40 and 42, from the drive train condition related component of the adjusted profiles, i.e. from lines 48 and 52 respectively, when the engine speed achieves a predetermined value, or values, relative to a reset engine speed reference value or values. The reset engine speed reference value or values are calculated at the time of the last shift to reflect the last engaged gear ratio, the engine speed at the time of the last shift and vehicle performance subsequent to the last shift required to minimize the possibility of hunting type future shifting. In the preferred embodiment, a band or range of engine speeds, related to the calculated expected engine speed after the last shift assuming constant vehicle speed, and defined by a minimum reset value and a maximum reset value, is established, operations within which band will not result in reseting of the profiles to the normal positions thereof.

By way of example, assume an upshift from a 1.00:1 ratio to a 0.732:1 ratio is initiated by the CPU 30 at eighty percent (80%) throttle. This will occur at point A at about 1800 RPM engine speed. The expected engine speed in the new ratio at constant vehicle speed is 1800 RPM×(0.732/1.00)=1317 RPM. Assuming constant throttle position, this is point B which is almost on the normal downshift profile 42. Additionally, if the operator increased throttle position to maintain the same engine horsepower after the shift, the increased throttle position would be at point B' which is to the left of the normal downshift profile 42. Without the offset or modification of the downshift profile to line 50 and then after a few seconds to line 52, an immediate downshift might be commanded, especially if the vehicle decelerated slightly, resulting in gear hunting.

Upon initiation of the upshift to the 0.732:1 ratio, the CPU logic calculates the expected engine speed in the new ratio; about 1317 RPM and, based upon this expected engine speed, defines a lower reset engine speed value 54 and an upper reset engine value 56, which lower and upper reset values, 54 and 56, define a band or range 58 of engine speed reset values 58. The last up driveline condition related downshift profile 52 will remain in effect until the current engine speed falls outside of band or range 58.

If, after the upshift, the engine speed increased to point C, this would indicate the vehicle has accelerated since the upshift, and the operating point would be further right of the normal downshift profile 42, and thus little likelihood of the hunting would exist. It is noted that upper reset valve 56 exceeds the value of line 42 at the throttle position value of point B'. The width of band 58 should be sufficient to encompass the values of throttle setting the driver may be expected to select assuming he wishes to maintain substantially constant vehicle performance in the higher as prior to the upshift. The band should, preferably, be wider than the actual band determined by engine characteristics to provide for the drivers probable inability to determine correct throttle adjustments.

If, after the upshift, the engine speed decreased to point D, a downshift could (depending upon throttle position) be called for. Hunting would no be likely as a downshift would place the engine speed to the left of the upshift profile by an amount determined by the difference between points B and D. For example, a downshift at point D (caused by resetting the downshift profile from line 52 to line 42, would result in an engine speed of about 1230 RPM×(1.00/0.732)=1680 RPM which is about 120 RPM below the upshift point A (1800 RPM).

Referring to FIG. 3, a similar example is presented for a downshift at 80% throttle from a 0.732:1 ratio to a 1.00:1 ratio. This will occur at about 1300 RPM at point E.

The engine speed after the downshift at constant vehicle speed in the new ratio (1.00:1) will be 1300 RPM×(1.00/0.732)=1776 RPM. Assuming constant throttle position, this is point F which is almost on the normal upshift profile 40. After readjustment of the throttle for constant engine horsepower, the operating position would go to point F'.

To avoid hunting, the upshift profile is set to line 46, and then after a predetermined time, to line 48.

Upon initiation of the downshift, the CPU 30 calculates the expected RPM in the new ratio (1.00:1), about 1776 RPM, and, based upon this expected engine speed, defines a lower reset engine speed value 60 and an upper reset engine speed value 62, which upper and lower reset engine speed values, 60 and 62, define a band or range 64 of engine speed reset values. The drive train condition related offset upshift profile 48 resulting from the last downshift profile 48 will remain effective until the current engine speed falls outside of the band 64, i.e. exceeds value 52 or is less than value 60.

If, after a downshift, the engine speed decreases to point G, this would indicate that vehicle speed has decreased since the downshift, and the operating point is further to the left of normal upshift profile 40, minimizing the likelihood of hunting. If after the downshift, engine speed increases to point H, an upshift could (depending upon throttle position) be called for. Hunting would not be likely, as an upssift would place the engine speed to the right of the normal downshift profile by an amount equal to about the difference between points F and H. For example, an upshift at point H caused by resetting of the upshift profile to the normal position 40 thereof, will result in an engine speed, after the upshift of about 1870 RPM×(0.732/1.00)=1370 which is about 70 RPM greater than point E and about 170 RPM greater than the downshift point on line 52, the static last up offset downshift profile at 80% throttle.

As with upshifts discussed above, the band 64 should accomodate probable driver variation of throttle position to maintain constant vehicle performance.

Figure 4:
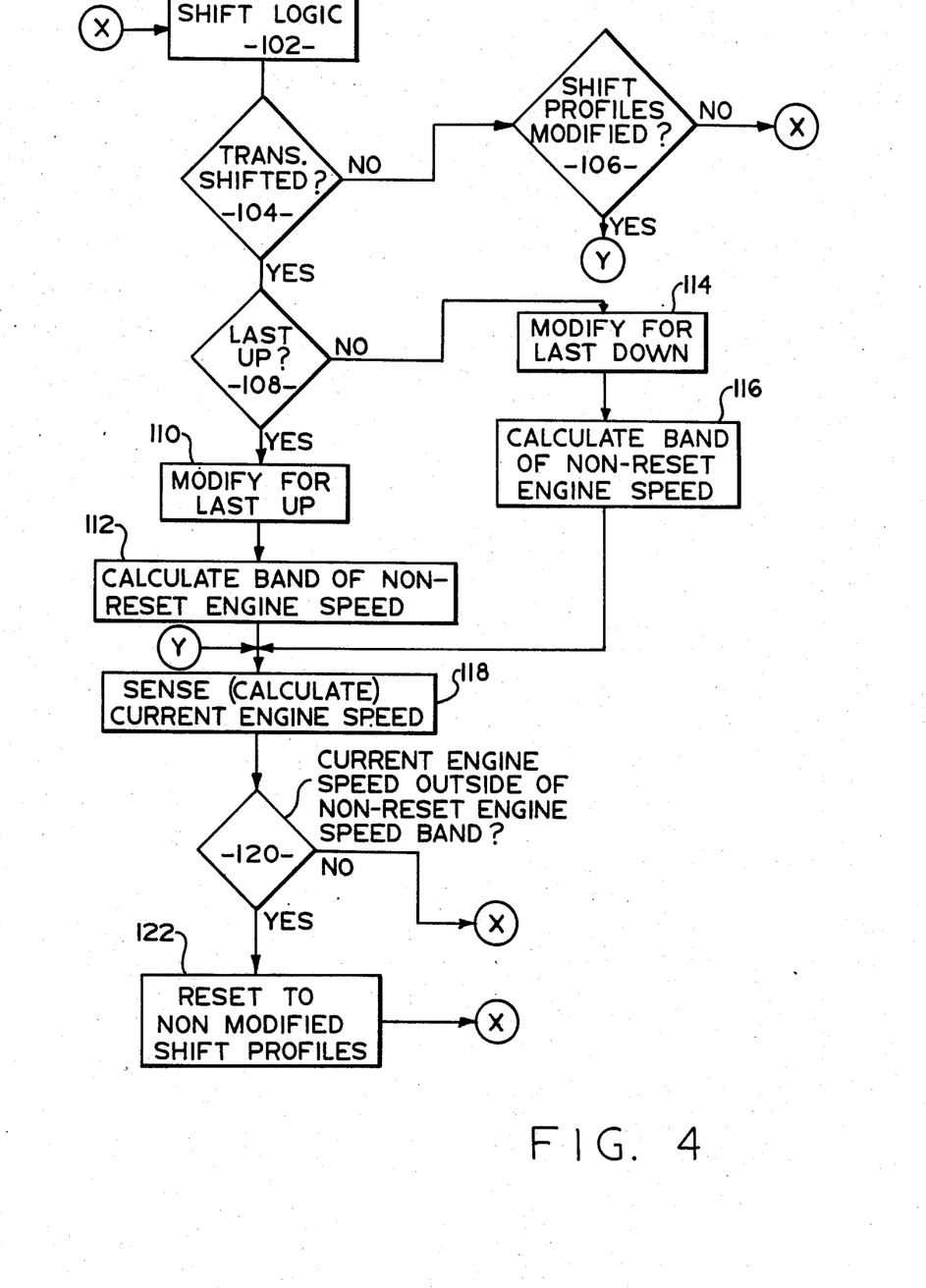
FIG. 4 is a symbolic illustration, in flow chart format, of the present invention.

A symbolic illustration, in flow chart format, of the present invention may be seen by reference to FIG. 4. Starting at point X, the shift logic 102 determines, in accordance with sensed, calculated and/or stored inputs, if a shift is required and, if required, issues command outputs to execute same. At block 104, it is determined if a transmission shift has just been executed. If a shift has not just been executed, ai. block 106 it is determined if the shift profiles currently utilized by the shift logic are modified (i.e. are shift profiles 48 or 52 being utilized). If the modified profiles are not being utilized, the logic routine returns to starting point X. If the shift profiles are modified, the logic routine goes to point Y to be discussed below.

If the logic 102 has just commanded a transmission shift, as determined at block 104, at block 108 it will be determined if the last shift was an upshift or a downshift (i.e. not an upshift).

If the last shift was an upshift, at block 110 the shift logic will be modified by lowering the engine speeds at which downshifts are commanded (profile 52 will be utilized instead of normally utilized profile 42). Then, at block 112, the logic will calculate a non-reset band of engine speeds (58).

If the last shift was a downshift, at block 114 the shift logic will be modified by raising the engine speeds at which upshifts are commanded (profile 48 will be utilized instead of normally utilized profile 40). Then, at block 116, the logic will calculate a non-reset band of engine speeds (64).

At block 118, if a shift has been commanded, or if the shift profiles are modified as the result of a previous shift as determined by block 106, the current engine speed 20 is calculated or sensed. At block 120, the current engine speed is compared to the non-reset engine speed band, 58 or 64, to determine if the current engine speed is outside of the band. If the current engine is not outside of the band, the logic routine returns to starting point X and the shift profiles remain modified. If the current engine speed is outside of the non-reset band, at block 122 the modified shift profile, 48 or 52, is reset to the normal nonmodified position, 40 or 42, respectively, and the logic routine returns to starting point X.

The purpose of setting the reset ranges, 58 and 64, is to set parameters, based upon the last engaged gear ratio, probable driver modifications of throttle position, the engine speed at time of initiation of the last shift and required vehicle performance subsequent to the shift which indicate that returning to the normal up and downshift profiles, 40 and 42, from the direction of last shift offset up and downshift profiles, 48 and 52, will not cause gear hunting. By returning to the normal shift profiles, 40 and 42, the vehicle is again operating in accordance with the normal or optimizig logic of the CPU and not by shift profiles offset to avoid gear hunting which tend to decrease fuel efficiency. By utilizing reset valves calculated for the actual conditions at the time of the last shift ahd set for required subsequent performance sufficient to minimize the likelihood of hunting, the improved control of the present invention is more responsive to actual conditions then the prior art automatic transmission control systems.

Although the present invention has been set forth with a certain degree of particularity, it is understood the various modifications are possible without departing from the spirit and scope of the invention as hereinafter claimed.

I claim:

1. An improved automatic transmission system for vehicles having a throttle-controlled engine, an operator actuated throttling control means and a transmission having a plurality of gear ratio combinations selectively engagable between a transmission input shaft and a transmission output shaft, said transmission input shaft being operatively connected to said engine, said transmission system including an information processing unit having means for receiving a plurality of input signals including (1) an input signal indicative of the position of said throttle controlling means, (2) an input signal indicative of the rotational speed of said engine, and (3) an input signal indicative of the speed of said vehicle, and (4) an input signal indicative of the direction of the last shift, said processing unit including means for processing said input signals in accordance with a program to select a desirable gear ratio for a given combination of input signals and for generating output signals whereby said transmission system is operated in accordance with said program, and means associated with said transmission effective to actuate said transmission to effect engagement of one of said gear ratio combinations in response to said output signals from said processing unit, said program having a first mode of operation and a second mode of operation, at least one of (a) the engine speeds at which said processing unit commands upshifts after a downshift being greater in said second than in said first mode of operation and (b) the engine speeds at which said processing unit commands downshifts after an upshift being less in said second mode than in said first mode of operation, said processing unit having means to set said program to said second mode of operation, the improvement characterized by:

said processing unit including means for processing said input signals to provide a calculated expected engine speed value indicative of the expected rotational speed of the engine in the selected gear ratio combination at the existing vehicle speed at the time of the last shift, said means to reset said program to said first mode of operation including means to calculate a minimum reset engine speed value and a maximum reset engine speed value as a function of said expected engine speed at the time of engagement of the last engaged gear ratio, and means to reset said program to said first mode thereof in response to engine speed exceeding said maximum reset value or engine speed being less than said minimum reset value;

said minimum reset engine speed value being less than said expected engine speed value and said maximum reset engine speed value being greater than said expected engine speed value.

2. The improved system of claim 1, wherein said minimum and maximum reset valves are independent of throttle position.

3. The improved system of claim 1, wherein the engine speeds at which upshifts and downshifts are commanded are a function of throttle position and the engine speeds at which downshifts are commanded in said second mode after an upshift at throttle positions increased to maintain substantially constant engine power are less than the expected engine speed value.

4. The improved system of claim 3, wherein said maximum and minimum reset values are independent of throttle position.

5. The improved system of claim 3, wherein the engine speeds at which downshifts are commanded in said second mode after an upshift at throttle positions increased to maintain substantially constant engine power are less than the minimum reset value.

6. The improved system of claim 5, wherein said maximum and minimum reset values are independent of throttle position.

7. The improved system of claim 3, wherein the engine speeds at which upshifts are commanded after a downshift in said second mode at throttle positions decreased to maintain substantially constant engine power are greater than the expected engine value.

8. The improved system of claim 7 wherein said maximum and minimum reset values are independent of throttle position.

9. The improved system of claim 7, wherein the engine speeds at which upshifts are commanded after a downshift in said second mode at throttle positions decreased to maintain substantially constant engine power are greater than the maximum reset value value.

10. The improved system of claim 9, wherein said maximum and minimum reset values are independent of throttle position.

* * * * *